(12) United States Patent  (10) Patent No.: US 7,562,099 B1
Walsh et al.  (45) Date of Patent: Jul. 14, 2009

(54) GRAPHICAL USER INTERFACE FOR A MEDIA MANAGEMENT SYSTEM FOR COMMUNICATING QUALITY, SOURCE AND ACCESSIBILITY INFORMATION FOR MEDIA DATA AND MEDIA OBJECTS

(75) Inventors: Patrick Walsh, Laval (CA); Roger Tawa, Jr., Brossard (CA); Steve McNeill, St. Lazare (CA)

(73) Assignee: Avid Technology, Inc., Tewksbury, MA (US)

( * ) Notice: Subject to any disclaimer, the term of this patent is extended or adjusted under 35 U.S.C. 154(b) by 16 days.

(21) Appl. No.: 11/223,562

(22) Filed: Sep. 9, 2005

(51) Int. Cl.
*G06F 17/30* (2006.01)
(52) U.S. Cl. ...................... 707/104.1; 707/1
(58) Field of Classification Search .................. 707/1, 707/100, 102, 104.1
See application file for complete search history.

(56) References Cited

U.S. PATENT DOCUMENTS

| | | | | |
|---|---|---|---|---|
| 5,892,507 A | * | 4/1999 | Moorby et al. | 715/205 |
| 5,969,716 A | * | 10/1999 | Davis et al. | 715/726 |
| 6,243,087 B1 | * | 6/2001 | Davis et al. | 715/723 |
| 6,426,778 B1 | * | 7/2002 | Valdez, Jr. | 348/461 |
| 6,584,152 B2 | * | 6/2003 | Sporer et al. | 375/240.01 |
| 6,628,303 B1 | * | 9/2003 | Foreman et al. | 715/723 |
| 7,124,366 B2 | * | 10/2006 | Foreman et al. | 715/719 |
| 7,512,885 B2 | * | 3/2009 | Walsh et al. | 715/723 |
| 2008/0120345 A1 | * | 5/2008 | Duncombe | 707/104.1 |

* cited by examiner

*Primary Examiner*—Cheryl Lewis
(74) *Attorney, Agent, or Firm*—Peter J. Gordon; Fish & Richardson; Oliver Strimpel

(57) ABSTRACT

A media management system communicates to a user the availability of media data at different qualities (such as compression quality or resolution), or from different channels, that originated from one or more sources. Given a selection of media objects, whether a set of media files, a sequence of clips or other collection of objects, the corresponding sources are identified. Media objects originating from or related to each of these sources are identified. A display is generated indicating, for each channel from the source, at each quality of data originating from that source, the media objects related to the source. Each media data file originating from that source is represented according to its channel and quality, as a time span corresponding to the time span of the source from which the data originated. Logged, but not captured, media data, and other media objects, also may be represented in the display. As a result, such a graphical interface may provides a two dimensional representation of either media data of various qualities in context of the sources from which they originated, or media objects in the context of the sources to which they are related, or both.

6 Claims, 4 Drawing Sheets

GRAPHICAL USER INTERFACE FOR A MEDIA MANAGEMENT SYSTEM FOR COMMUNICATING QUALITY, SOURCE AND ACCESSIBILITY INFORMATION FOR MEDIA DATA AND MEDIA OBJECTS

BACKGROUND

Modern editing systems for editing time-based media such as video and audio are based on the concept of creating relationships between digitized media and metadata describing this media. Furthermore, users can combine the metadata (such as "masterclips" and "sequences") into complex time-based and geometry-based structures. Such metadata also may be collected according to projects. As a consequence, relationships between media and metadata, or among metadata, generally are not one-to-one. For example, a masterclip may refer to multiple pieces of media (e.g., at different digitizing qualities). Similarly, a masterclip may be used by multiple sequences. Such relationships typically define a general graph, which is neither acyclic nor directed. Relationships described by a general graph are hard to describe, visualize and navigate.

To navigate relationships among files and directories in a computer, users generally expect to use a tree structure, as in the Explorer interface in the Windows operating system from Microsoft Corporation. Such a tree structure generally is useful when relationships between objects are exclusively parent-child or container-containee one-to-many relationships with no overlap. These relationships are typically acyclic and directed. Thus, tree structures are useful for files systems in which a folder or file belongs in one and only one folder. A tree structure does not adequately describe the multiple relationships present in a media/metadata environment.

SUMMARY

A media management system communicates to a user the availability of media data at different qualities (such as compression quality or resolution), or from different channels, that originated from one or more sources. Given a selection of media objects, whether a set of media files, a sequence of clips or other collection of objects, the corresponding sources are identified. Media objects originating from or related to each of these sources are identified. A display is generated indicating, for each channel from the source, at each quality of data originating from that source, the media objects related to the source. Each media data file originating from that source is represented according to its channel and quality, as a time span corresponding to the time span of the source from which the data originated. Logged, but not captured, media data, and other media objects, also may be represented in the display. As a result, such a graphical interface may provides a two dimensional representation of either media data of various qualities in context of the sources from which they originated, or media objects in the context of the sources to which they are related, or both.

Accordingly, in one aspect, a user interface of a media management system is provided. The user interface permits a user to select one or more media objects. The media management system identifies one or more media sources for each of the selected media objects. Media data files and/or other media objects that are available to the media management system and that include media data originating from each of the one or more sources, or refer to these sources, are identified. A display is generated in which each identified media data file is represented as a time span corresponding to a time span of the source from which the data in the media data file originated. Given such a display, a user may select one or more media objects that are represented in the graphical user interface and perform a variety of operations on those media objects.

DETAILED DESCRIPTION

Figure 1:
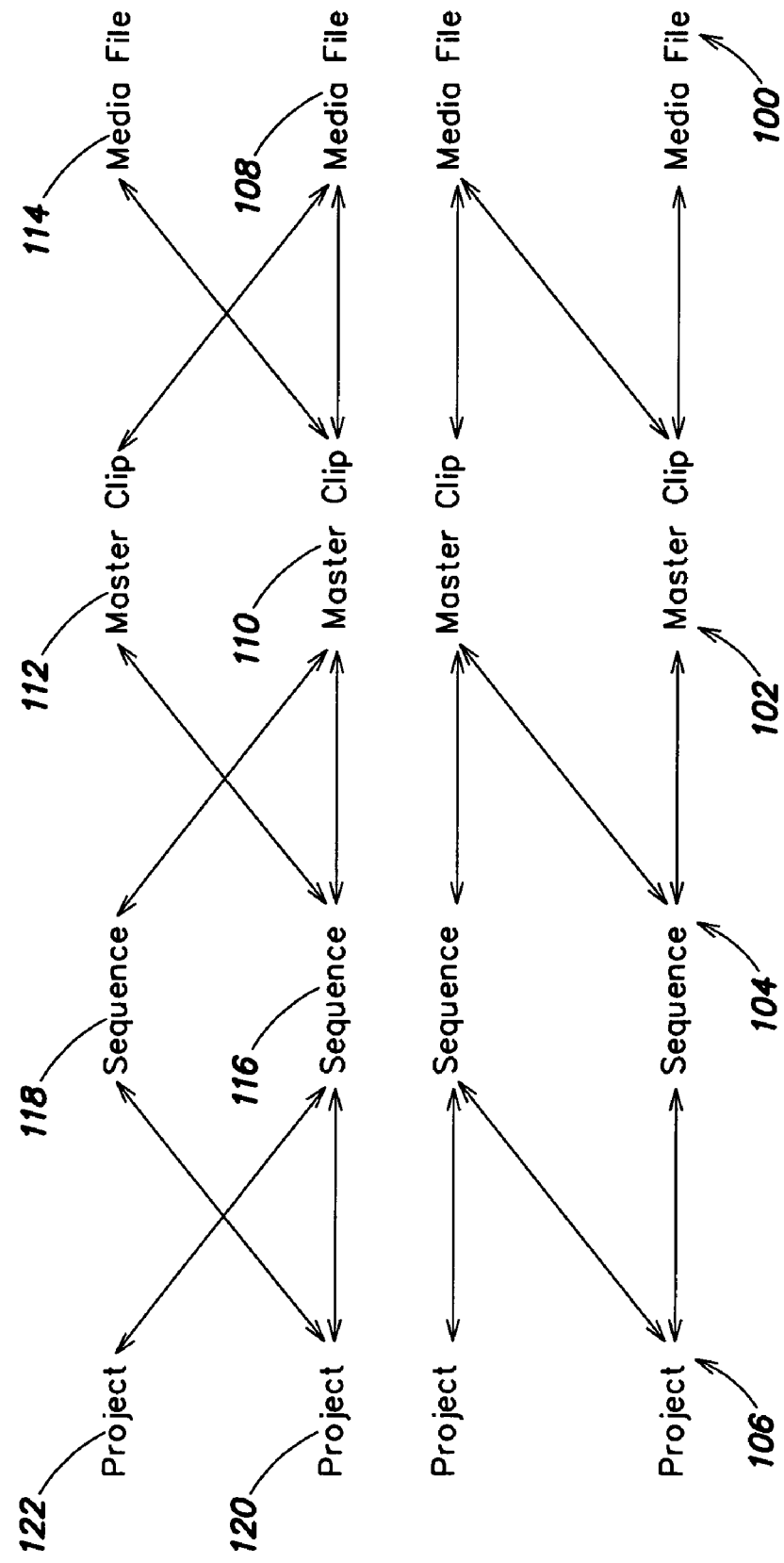
FIG. 1 is a diagram illustrating bidirectional and many-to-many relationships among a set of example object types.

Referring now to FIG. 1, an example of kinds of object types and relationships among them will now be described. This example is derived from a video editing system in which media files 100 are referenced by masterclips 102, which in turn are combined into sequences 104. Sequences may be collected into projects 106. Media files include media data. The other object types include metadata. A media file, e.g., 108 may be referenced by more than one masterclip, e.g., 110 and 112. A masterclip, e.g., 110, may reference more than one media file, e.g., 108 and 114. Similarly, a masterclip, e.g., 110, may be referenced by more than one sequence, e.g., 116 and 118. A sequence, e.g., 116, may reference more than one masterclip, e.g. 110 and 112. Similarly, a sequence, e.g., 116, may be referenced by more than one project, e.g., 120 and 122. A project, e.g., 120, may reference more than one sequence, e.g., 116 and 118. Relationships from the left to right in this diagram, or towards media data, are called "forward relationships" herein. Relationship from right to left in this diagram, or away from media data, are called "backward relationships" herein. A "forward relationship" from a first object to a second object can be understood as one where the first object uses the second object. A "backward relationship" from a first object to a second object can be understood as one where the first object is used by the second object.

The relationships among these objects in FIG. 1 may be represented by double maps. A first map maps each object of a first type to objects of a second type that it references. A second map maps each object of the second type to objects of the first type that it references. A double map is used for each relationship that may exist between pairs of types of objects. These maps may be created by indexing objects, such as projects, sequences and masterclips, to locate the relationships defined by those objects. Such an indexer is described below. The maps may be queried using one or more keys identifying objects, and the map returns a set of the objects related to the identified objects in the map.

The media data and master clips also refer to sources from which the media data originates. The relationships among the media objects (such as master clips), media data files and sources may be tracked through a database or index. For example, metadata about the origin of a media file may be stored in the media file itself. A set of media files can then be indexed by extracting this metadata from all the media files and generating an index mapping metadata information to media files and media files to metadata information.

A media indexer maintains an index that associates metadata about the media data with the name (e.g., the path and filename) of a media file that includes that media data. The metadata also may be stored in the media file. Such metadata may include, for example, an indication of a source from which the media was obtained, such as a tape name, a range of data from the source, such as start and stop time codes in the source, and an indication of the quality of the media data. In the process of indexing a media file, any metadata included in the media file is extracted from the media file and stored in the index along with the name of the media file. Example indexes for media files are described in U.S. Pat. No. 5,267,351 and U.S. Pat. No. 6,157,929, which are hereby incorporated by reference. An index may be maintained as a multidimensional database. For example, the database may be a table of "media slots" where each media slot corresponds to a time span and a quality. This database permits a search of whether a media file is available that corresponds to specified metadata, such as specified time span of a source and a specified quality. The database may be implemented to perform federated and chained searches.

To maintain such an index, a media indexer monitors activity on any storage location with which it is associated. How the monitoring is performed depends on the operating system and file system that manages the storage locations and how the indexer can communicate with the operating system and file system. For example, this monitoring of local storage on a Windows platform may be performed by registering a process for the indexer to receive notifications of changes from the Windows file system. This mechanism is called the ReadDirectoryChangesW application programming interface (API) in the Windows operating system. For remote storage using the Windows operating system, a similar mechanism may be used, called the FindFirstChangeNotification and FindNextChangeNotification APIs in the Windows operating system. In such an embodiment, any additions, deletions or other modifications to files in the designated storage locations cause a notification to be sent to the media indexer, which in turn updates its index. Other ways to perform such monitoring include having the indexer periodically poll or scan the file system for information to detect changes, or to have the operating system provide a form of notification through an interrupt or event to be processed. The index then can be accessed by any of a number of applications in the same manner as conventional indexes.

Because there may be many different types of media data and thus media files, a plug-in architecture may be used to allow for specification of new types of media files. Such a structure, herein called a table adapter, is provided for this purpose. A table adapter extracts the media metadata from the media file, in whatever form it may be, and then "adapts" it to structure of the database stored by the media indexer. This architecture permits any media file type to be indexed so long as a specific table adapter for the media file type is created.

The foregoing described indexing of media files and metadata about media data. Another kind of metadata is compositional metadata. Compositional metadata is metadata that describes how media is combined to create master clips, sequences and projects, for example, and may be understood as capturing creative decisions about the media in a project. Such compositional metadata also may be indexed. A project indexer thus tracks which elements of the compositional metadata use which media files.

The compositional metadata that may be stored depends on how a composition is represented by the editing application. Example kinds of compositional metadata include those defined for the Advanced Authoring Format (AAF) and the Open Media Framework (OMF). In general, projects are collections of compositions, which are collections of other objects that reference media files. A project indexer would map the relationships among projects, compositions, other objects and the references to media files.

As a particular example, each element of the compositional metadata may be structured as a directed acyclic graph (DAG) that has a time span. Each element in a DAG is called an operator. Each operator may reference media or may perform an operation on media. Master clips and sequences reference one or more DAGs. A project may reference one or more master clips and/or sequences. A secure one-way hash function may be used to generate one or more digests of each element of a DAG, based on the state of the element itself and the digests of the children elements in the DAG. Each digest is called a data alias. A data alias acts a reasonably unique identifier for a given time span of a given element in the DAG. There is a one-to-one correspondence between a media slot in the media index and a data alias. Each compositional metadata element is associated with one or more data aliases. In this example, the index developed by the project indexer maps each element of compositional metadata to the one or more compositional metadata elements that it includes, and/or to the data alias for the media file it references.

The project indexer, similar to the media indexer, is associated with one of more storage locations where compositional metadata files, such as masterclip files, sequence files and project files or directories, are stored. The project indexer monitors its associated disk locations and maintains a project database consistent at all times with contents of the associated storage locations, without any external intervention.

An additional data structure is used to manage information about the sources themselves as they are used by a project. Such a data structure is referred to as a source model. A source model may be stored in a file associated with a project, such is in a root directory or a hidden subdirectory for the project. The information kept in a source model can be described as a series of channels, where each channel has a unique identifier (UUID) called a "Channel ID" and represents a media type, such as audio or video. The source model also may include capture parameters, such as video settings for video capture hardware or audio setting for audio capture hardware. A source model may be created at any time, for example, at the time the source is logged. The process of logging from sources to be captured for eventual use generates master clips. The content of these master clip files defines what the master clip consumes by storing the Channel IDs and associated spans from these channels. With this implementation, a sequence is like a meta master clip, in which a set of ChannelIDs and spans are kept in an ordered collection in time. Also with this implementation of source models, the process of capturing material creates media files in which the metadata section refers to the Channel ID and span of the source from which the media data in the file originated.

Figure 2:
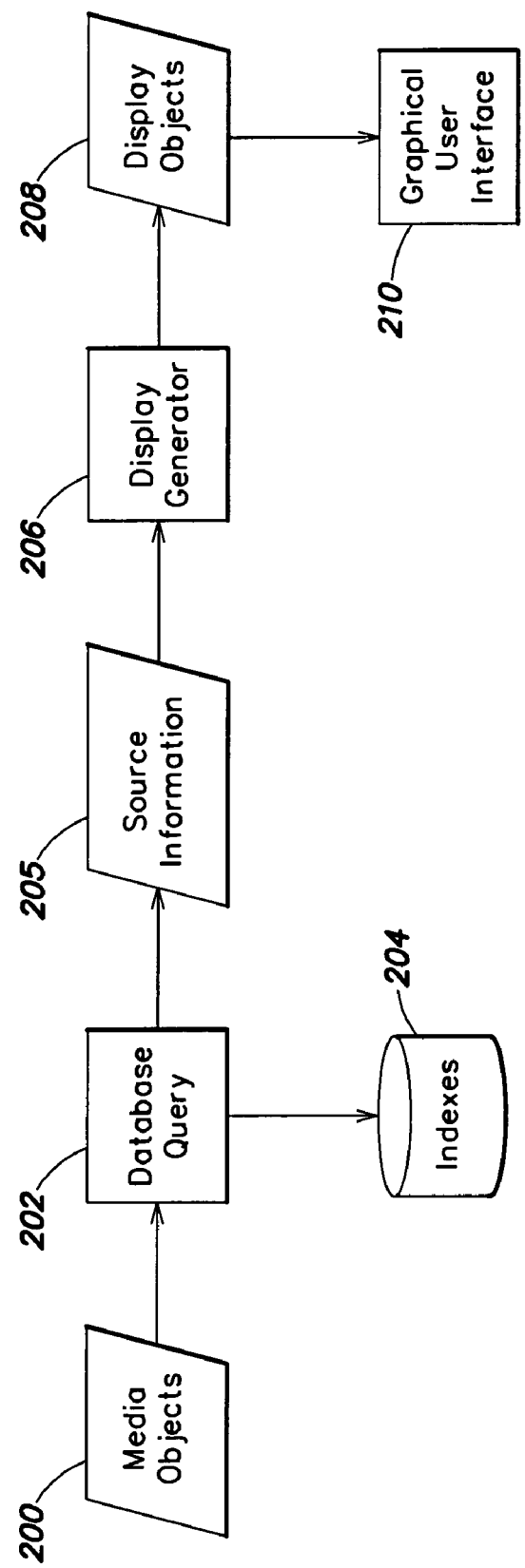
FIG. 2 is a data flow diagram of an example media management system.

Having now described an example implementation of some data structures for tracking media data and meta data, a navigation tool for a media management system using these data structures will now be described. Referring now to FIG. 2, an example implementation of a navigation tool that provides a two dimensional representation of media of various qualities in context of the source from which it originated will now be described. Given a selection of one or more objects 200 provided to a database query 202, the indices 204 (comprised of the source model, media index and project index) are searched to identify the source information 205 from which the display will be generated. The objects 200 may include any media object, media file or source. The source information 205 may include the source from which each object 200 originated or to which the object refers, the media files originating from those sources, and/or the media objects referring to those sources. In particular, for each source, the source model is accessed to identify the channels defined for that source. Given the identified channels, the project indexer is used to identify the names of the master clips, sequences and other media objects consuming specific channels. The media indexer is used to identify the names of the media files which are associated with a specific channel and span.

Given the source information 205, the display generator 206 generates the display objects 208 that are displayed through the graphical user interface 210. An example display will now be described in connection with FIG. 3.

The display has a vertical axis 300 and a horizontal axis 302. The vertical axis displays the sources and qualities at which media is or can be captured. The horizontal axis displays the start and end times of media data in the context of time associated with the source from which it originated. The horizontal axis also displays the start and end times of media objects that refer to the sources. The identified sources, media objects and media files are sorted first by their source, then by the media type (channel), then by quality, then by time. This hierarchy of sources, channels and qualities can be represented using a tree structure 304 to permit a user to navigate and select from among the sources, channels and qualities. Time is represented by a legend 306 which relates to timing data associated with the currently selected source in the tree structure 304. The display indicates on the horizontal axis the presence of media files with data at specific qualities in time using "quality entries" 312 of a first color, such as green. The display indicates the presence of referencing masterclips, sequences and other objects using "object entries" 310 of a second color, such as dark gray. The display also indicates the presence of the referenced regions of any of the originally selected objects with "source entries" 308 of a third color, such as white.

Figure 3:
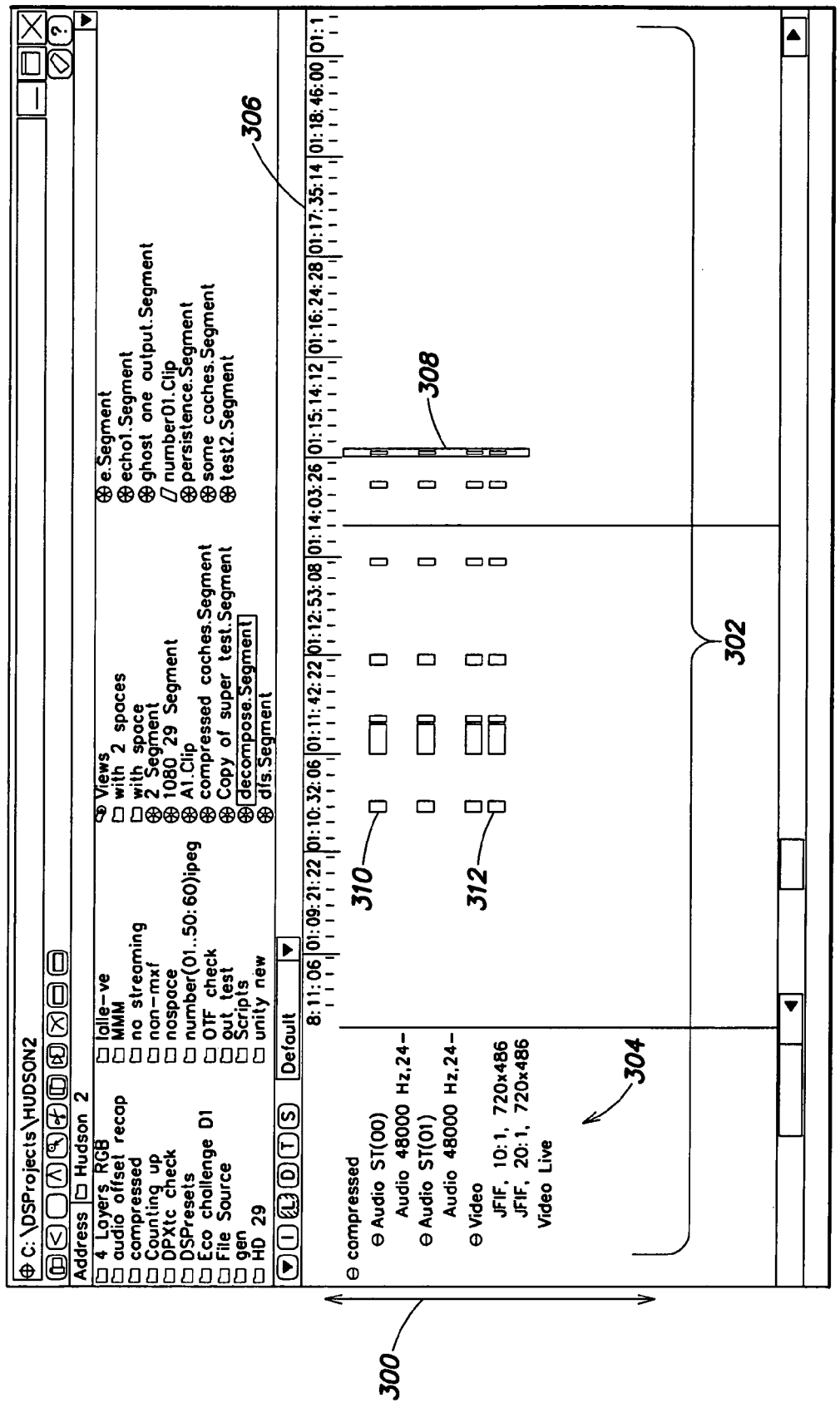
FIG. 3 is an example graphical user interface for the media management system of FIG. 2.
Figure 4:
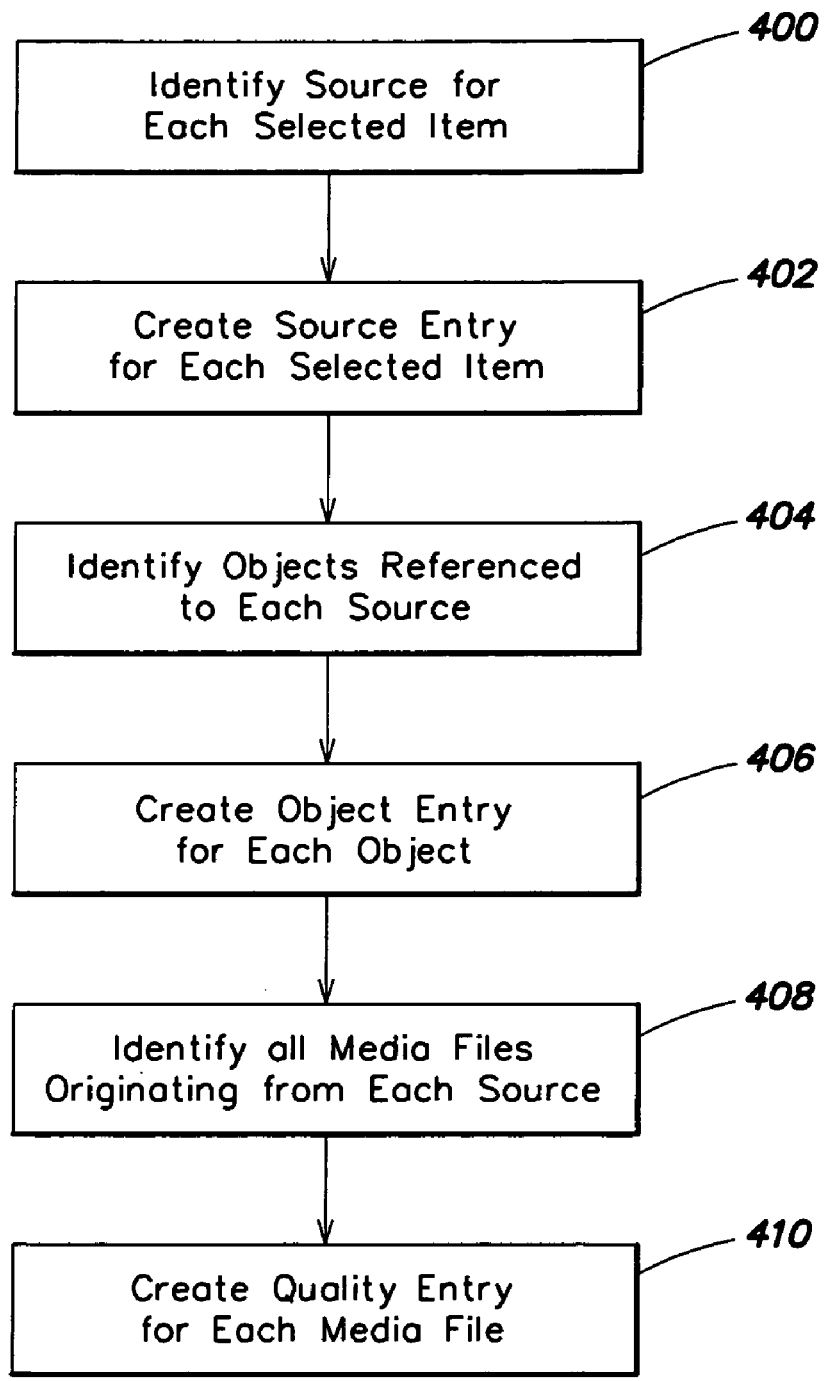
FIG. 4 is a flowchart describing operation of the media management system of FIG. 2.

A flowchart in FIG. 4 describes the process used to create the display of FIG. 3 using the system of FIG. 2. In particular, for each selected item, using the project indexer, identify 400 the sources and time spans on those sources from which the selected item originates. A source entry is created 402 in the display for the source and time span on that source corresponding to each selected item. This source entry may be displayed, for example, in white. Next, for each source that is identified, the project indexer is used to identify 404 all spans of that source that are referenced by other sequences, clips, logged clips or other media objects in a project. An object entry is created 406 in the display for the source and the time span on that source corresponding to each identified media object that references the source. Each object entry may be displayed in a color different from the source entries, for example, in gray. Next, for each source that is identified, the media indexer is used to identify 408 all media files at all quality levels that originated from the source. For every quality of media data that is identified in a media file originating from a source, a quality entry is created 410 in the display for the source, time span on the source and channel corresponding to each identified media file that originated from the source. Each quality entry may be displayed in a color different from the source entries and object entries, for example in green.

Given this display, a user can interact with the display to selected media files and logged clips to perform a variety of operations. Such operations could be initiated, for example, through contextual menus associated with the displayed objects in the graphical user interface. For example, a user may select a quality level and instruct the media management system to purge all media files originating from a source at the selected quality level. A user can modify timing data associated with the media file with respect to the time span of the source from which it originated. The user can select media files for transcoding to generate new media files with media data of a different quality. For example, the user can select audio files and request sample rate conversion to be applied to create new media files with audio data of a different quality. A source or a logged clip could be selected to initiate recapture of the media data of different qualities from the source. A viewer and/or source side effects also could be associated with a selected object. Any other operation on a media files, logged clip, source or channel of a source also could be initiated for a selected object in the display.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIG. 2 may include one or more computer programs, may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A computer program residing on a computer-readable memory, the program comprising instructions that, when processed on a computer, cause the computer to:
   receive an indication of one or more media objects;
   identify one or more media sources related to the one or more media objects;
   identify all media data files available to the media management system that include data originating from each of the one or more identified media sources; and
   display a timeline in which each identified media data file is represented as a time span with reference to a time span of the source from which the data in the media data file originated.

2. The computer program of claim 1, further comprising instructions for causing a computer to:
   identify all logged clips that reference the one or more identified media sources; and
   display on the timeline a representation of each identified logged clip using a time span of the source to which the logged clip refers.

3. The computer program of claim 1, further comprising instructions for causing a computer to:
   display on the timeline a representation of each of the one or more media objects using a time span on the source to which the media object refers.

4. A computer program product comprising:
   a computer readable memory; and
   computer program instructions stored on the computer readable memory that, when processed by a computer, instruct the computer to perform a method for providing a user interface of a media management system, comprising:
   receiving an indication of one or more media objects;
   identifying one or more media sources related to the one or more media objects;
   identifying all media data files available to the media management system that include data originating from each of the one or more identified media sources; and
   displaying a timeline in which each identified media data file is represented as a time span with reference to a time span of the source from which the data in the media data file originated.

5. The computer program product of claim 4, further comprising:
   identifying all logged clips that reference the one or more identified media sources; and
   displaying on the timeline a representation of each identified logged clip using a time span of the source to which the logged clip refers.

6. The computer program product of claim 4, further comprising:
   displaying on the timeline a representation of each of the one or more media objects using a time span of the source to which the media object refers.

* * * * *